United States Patent [19]

Perl

[11] 4,375,587
[45] Mar. 1, 1983

[54] MICROWAVE OVEN ENERGIZATION CIRCUIT AND COMPONENTS THEREFOR

[75] Inventor: Richard L. Perl, Mansfield, Ohio

[73] Assignee: The Tappan Company, Mansfield, Ohio

[21] Appl. No.: 177,777

[22] Filed: Aug. 13, 1980

[51] Int. Cl.³ .............................................. H05B 6/68
[52] U.S. Cl. ...................... 219/10.55 B; 219/10.55 R; 310/68 E; 310/209; 361/159
[58] Field of Search .................. 219/10.55 B, 10.55 R, 219/10.55 M; 310/68, 68 E, 209; 361/159

[56] References Cited

U.S. PATENT DOCUMENTS

| | | | |
|---|---|---|---|
| 3,065,398 | 11/1962 | La Bov | 310/209 X |
| 3,153,159 | 10/1964 | Lord | 310/209 X |
| 3,233,135 | 2/1966 | Holzer et al. | 310/209 |
| 3,842,233 | 10/1974 | Lamb | 219/10.55 |
| 4,011,427 | 3/1977 | Risman | 219/10.55 B |
| 4,025,804 | 5/1977 | Rickard | 219/10.55 B X |

OTHER PUBLICATIONS

U.S. patent application Ser. No. 176,192, filed Aug. 7, 1980, Now U.S. Pat. No. 4,321,447.

*Primary Examiner*—B. A. Reynolds
*Assistant Examiner*—Philip H. Leung
*Attorney, Agent, or Firm*—Maky, Renner, Otto & Boisselle

[57] ABSTRACT

A fan motor sequencing switch assembly is employed to effect delayed full power energization of a magnetron in a microwave oven for protecting the magnetron and energization circuit therefor against high start-up current surge and for cooling the magnetron during oven operation. The sequencing switch is connected in parallel with a start circuit consisting of a start switch and serially connected current limiting resistor, and is operated by an actuator movable by the magnetic field induced in the fan motor upon energization, the motor being connected to the start switch and sequencing switch for energization through either switch. In the preferred embodiment, the actuator is the rotor of the motor which is mounted for rotation and limited axial movement with respect to the motor stator and normally biased to a position with its magnetic center axially displaced from that of the stator, whereby upon energization of the motor, the rotor is caused to move axially by the induced magnetic forces in the rotor and stator to effect delayed actuation of the sequencing switch.

6 Claims, 4 Drawing Figures

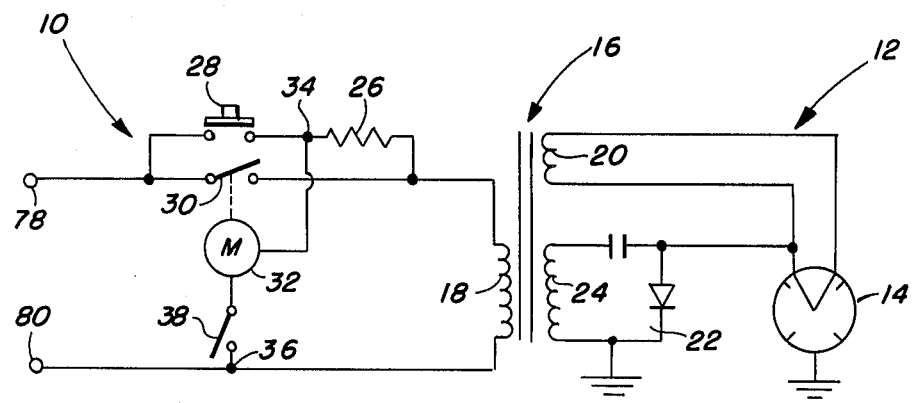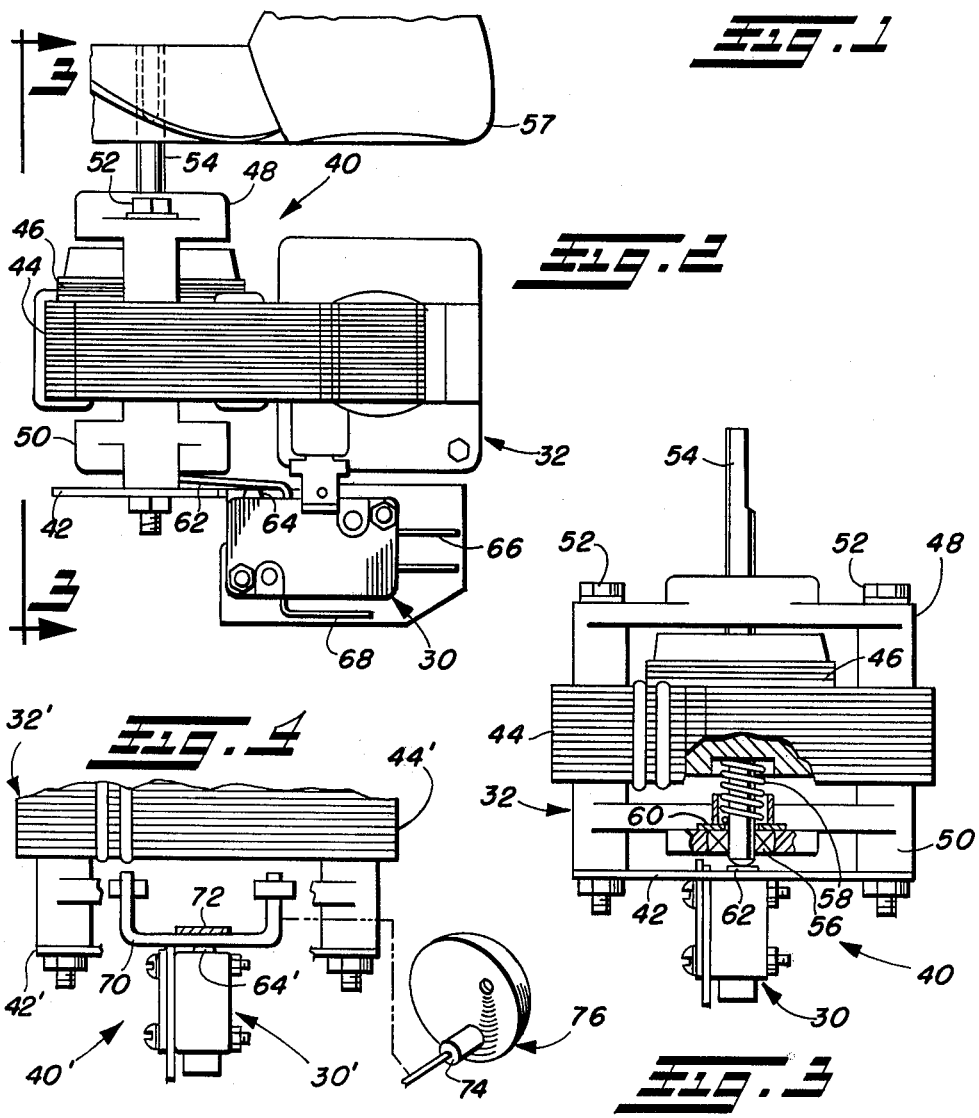

MICROWAVE OVEN ENERGIZATION CIRCUIT AND COMPONENTS THEREFOR

The present invention relates to a microwave oven energization circuit and components employed therein.

In conventional microwave ovens, a magnetron tube energized through a transformer coupling produces microwave energy, i.e., high frequency electromagnetic energy, to cook food within the oven cooking cavity. When starting the oven, a high current is drawn by the transformer which poses a difficulty in that the high starting current subjects other circuit components in the energization circuit to potential damage. Moreover, the high starting current constitutes a start-up shock to the magnetron which reduces the effective life thereof.

To avoid the high current pulse during starting, it is known to use a start switch in series connection with a current limiting resistor in the energization circuit for the magnetron to provide a low starting current therefor, and a surge or sequencing relay having a small inherent delayed response coupled across the energization circuit to operate a normally open switch for bypassing the resistor shortly after the magnetron is energized by the low starting current. Reference may be had to applicant's assignee's U.S. Pat. No. 3,842,233 for a showing of an exemplary energization circuit employing a current limiting resistor and sequencing relay.

Conventional microwave ovens also normally employ a fan motor for cooling the magnetron and a thermostat for sensing the temperature of the magnetron. The fan motor usually is coupled in the energization circuit for the oven to operate whenever power is supplied to the magnetron while the thermostat is coupled therein for shutting off the oven in the event the magnetron overheats.

Such aforementioned sequencing relay and thermostat add to the complexity of the energization circuit and make such circuit more expensive. It therefore would be advantageous to eliminate one or both of these elements, if possible, without adversely affecting the performance and safety of the oven or instead to improve oven performance and safety.

SUMMARY OF THE INVENTION

With the foregoing in mind, a microwave oven according to the present invention is characterized by a magnetron for generating high frequency energy, a fan motor for cooling the magnetron and an energization circuit therefor. The energization circuit includes a start switch circuit portion consisting of a serially connected current limiting resistor and normally open start switch for providing starting current in the energization circuit for effecting energization of the magnetron. A second or sequencing switch connected in parallel with such series circuit provides full power to the magnetron when actuated by an actuator movable by the magnetic field induced in the motor upon energization of the latter, and a branch circuit portion connects the fan motor to the start and second switches for energization through either switch. The actuator due to inertia provides a short delay between initial energization of the motor and actuation of the second switch whereby the start switch circuit portion provides a small current to the magnetron for the period of such delay, following which full power is supplied to the magnetron upon operation of the second switch. As a result, a separate surge or sequencing relay for switching full power to the magnetron no longer is needed.

Preferably, the actuator is the rotor of the motor which is mounted for rotation and limited axial movement with respect to the stator and normally biased to a position with its magnetic center axially offset or displaced from that of the stator whereby upon energization, the rotor is caused to move by the induced magnetic forces in the rotor and stator to effect actuation of the sequencing switch. As a result, a thermostat need not be employed as most faults that may prevent proper magnetron cooling such as open motor coil and stuck rotor, will keep the rotor in its deenergized position and thus the sequencing switch open preventing full power from being applied to the magnetron. Alternatively, a pole piece for the stator may be provided which is normally biased away from the stator but upon energization of the motor is drawn to the stator by magnetic attraction, the switch being actuated in response to such movement of the pole piece.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but several of the various ways in which the principles of the invention may be employed.

BRIEF DESCRIPTION OF THE DRAWING

In the annexed drawing:

FIG. 1 is a schematic circuit diagram of an energization circuit for a microwave oven according to the present invention;

FIG. 2 is a side elevation of one form of fan motor-switch assembly employed in the energization circuit of FIG. 1;

FIG. 3 is an end elevation, partly in section, of the assembly of FIG. 2, looking in the direction of the arrows 3—3 thereof; and FIG. 4 is a fragmentary end elevation, partly in section, of another form of fan motor-switch assembly which may be employed in the energization circuit of FIG. 1.

DETAILED DESCRIPTION

Referring now more specifically to the drawing, an electric energization circuit for a microwave oven is shown generally at 10 in FIG. 1, and is connected to an output circuit 12 for energizing the magnetron 14 of the oven. The output circuit 12 includes a coupling transformer 16 having a primary winding 18 coupled to the energization circuit 10 and a first secondary winding 20 providing heater energization in the magnetron 14. The output circuit 12 further includes a circuit 22 including a second secondary winding 24 providing high voltage energization for the magnetron.

In the energization circuit 10, there is included a series coupled current limiting or protective resistor 26, which may be a PTC thermistor, and a start switch 28, the latter being, for example, a normally open pushbutton type switch. A second or sequencing switch 30 is coupled in parallel with such series circuit, i.e., the protective resistor 26 and start switch 28, and is closed upon energization of a fan motor 32 which is connected to such series circuit at the node 34, representing the connection point of the start switch 28 and the protective resistor 26, and the neutral side of the energization circuit at node 36 through an oven control or shut-off switch 38. The shut-off switch 38 may be, for example, an interlock safety switch, a timer operated switch or otherwise controlled switch.

Referring now to FIGS. 2, and 3, it will be seen that the switch 30 and fan motor 32 are in the form of an assembly indicated generally at 40, such assembly further including a mounting plate 42, which has a right angle depending portion to which the switch 30 is secured by suitable fasteners. The stator 44 and rotor 46 of the motor 32 are also secured to the mounting plate by opposed yokes 48 and 50, which respectively are generally of U-shape and H-shape, and fasteners 52 which extend through the aligned legs of the yokes. The stator is sandwiched between the aligned legs of the respective yokes while the rotor is mounted on a rotor shaft 54 journaled for rotation by bearings 56 in the bight portions of the yokes. As shown, the rotor shaft is orientated vertically as is preferred and at its upper end extends substantially beyond the top yoke for mounting thereon of a fan blade 57.

In FIG. 3, it can be seen that the rotor 46 and shaft 54 are also mounted for at least limited axial movement such as by permitting the rotor shaft 54 to slide axially in the bearings 56, the rotor normally being biased upwardly by a spring 58 positioned on the shaft between the rotor and lower bearing. If desired, a washer 60 may be provided between the spring and bearing which rotates along with the rotor when the motor is energized to reduce the torsional forces acting on the spring and eliminate damage to or interference with the bearing as well as drag on the rotor.

When the motor 32 is deenergized as shown, the spring 58 urges the rotor 46 to a position such that its magnetic center is axially offset or displaced from that of the stator 44. Accordingly, when the motor is energized, the magnetic forces induced in the rotor and stator will cause the rotor to move axially against the spring force until the magnetic centers coincide. Such axial movement of the rotor will also be assisted by the developed axial force resulting from rotation of the fan blade 57. At the same time, the rotor shaft 54 will move axially along with the rotor, the end of the shaft then extending beyond the lower bearing in plunger-like fashion into engagement with the distal end of the switch operating lever 62 which in turn engages and actuates the switch actuator 64 to close the switch 30, there being a short delay between closure of the switch 30 and initial energization of the motor due to the inertia of the rotor. Upon deenergization of the motor, the spring will return the rotor and shaft to the position shown in FIGS. 2 and 3 thereby opening the switch. In this manner, the rotor acts as an actuator movable by the magnetic field induced in the motor upon energization for operating the switch 30.

As depicted, the switch 30 is a double pole single throw switch, and has terminals 66 and 68 for connecting the input and output terminals of the switch in the energization circuit, although a single pole single throw switch as well as other types of switches may be used. The motor 32 shown also has terminals for connecting same in the energization circuit and may be designed to provide an axial rotor movement upon energization of about 0.1 inch to actuate the switch 30 in the arrangement shown.

It should be understood that the motor 32 need not drive the fan for the magnetron, although this is preferred. Instead, the motor could drive, for example, a cycle timer where one is employed to control the energization time for the magnetron.

It also should be understood that other arrangements may be employed for actuating the switch 30 directly but in delayed response to energization of the fan motor 32 through use of the magnetic field induced therein. One such alternative arrangement is shown at 40' in FIG. 4 wherein primed reference numerals designate elements corresponding generally to those identified above by the same unprimed reference numerals. The construction of the motor 32' of the assembly 40' is similar to that described above, however the rotor in this arrangement only need be mounted for rotation relative to the stator 44'. Instead of the rotor moving axially to operate the switch 30', the switch is operated by a pole piece 70 which is drawn to the stator 44' upon energization of the motor against a biasing force, such movement of the pole piece effecting actuation of the switch.

As shown in FIG. 4, the pole piece 70 is mounted for movement to and from the stator 44' by a spring element 72. The spring element 72 may be a strip of spring steel secured as its respective ends to the pole piece and mounting plate 42' and deformed in such a manner to bias the pole piece into engagement with the switch actuator 64' of the switch 30', normally for maintaining the switch in its open condition. It should be understood that in this arrangement, the switch 30' is connected in the energization circuit 10 so that when the switch actuator 64' is depressed, the switch is open and when not depressed, the switch is closed. Accordingly, upon energization of the motor, the magnetic forces induced in the stator will cause the pole piece to move to the stator and away from the switch actuator thereby permitting the latter to move to its switch closed position. Upon deenergization of the motor, the spring element 72 will return the pole piece to the position shown thereby opening the switch. In addition to operating the switch, such movement of the pole piece also could be employed to drive the clapper 74 of a bell 76 thus to generate an audible signal indicating that the motor has been energized or, as is more commonly the case, deenergized indicating that the oven has shut off.

Reverting now to FIG. 1, the operation of the energization circuit 10 employing the motor and switch assembly 40 will be described. To effect operation, the circuit input terminals 78 and 80 are connected to a supply of electrical power whereupon closure of the start switch 28 provides current through the protective resistor 26 to the primary winding 18 of the coupling transformer 16 to energize the output circuit 12 and thus the magnetron 14. Also upon closure of the start switch, current flows from the node 34 to energize the fan motor 32, provided the control switch 38 is closed, to close the motor operated switch 30 thereafter to supply full power to the magnetron. Accordingly, a small current will pass through the start switch and protective resistor to the output circuit prior to application of full power for a period equal to the delay time required to energize the motor and close the motor operated switch, such operation protecting the magnetron and energization circuit from high start-up current surge. When the start switch is returned to its normally open position, the fan motor initially energized through the start switch will thereafter be maintained energized by reverse current flow through the resistor or more precisely current flow in the opposite sense when alternating current is employed thus providing the necessary cooling to the magnetron as long as the magnetron is energized.

In the event of a fault in the magnetron cooling circuit such as an open motor coil or a stuck rotor, it will be seen that the motor 32 will not effect closure of the switch 30 and hence prevent full load current from flowing to the magnetron 14. Since an open motor coil and stuck rotor are the most common faults that may prevent proper magnetron cooling, it will be appreciated that a magnetron over-temperature thermostat is not needed and thus may be eliminated thereby resulting in further circuit simplification and cost reduction. Moreover, a separate surge or sequencing relay is no longer needed in the energization circuit.

It should now be clear that there is provided an improved energization circuit for providing power to the magnetron in a microwave oven as well as for driving the cooling fan motor therefor, such circuit also being protective against transient current surges and circuit failure. In addition, there is also provided a motor and switch assembly that may have other uses than in the energization circuit of the type shown. It is also contemplated that the present invention may be employed in other electrical apparatus as well.

Although the invention has been shown and described with respect to a preferred embodiment, it is obvious that equivalent alterations and modifications will occur to others skilled in the art upon the reading and understanding of the specification. The present invention includes all such equivalent alterations and modifications, and is limited only by the scope of the claims.

The embodiments of the invention in which an exclusive property or privilege is claimed are defined as follows:

1. In a microwave oven, a magnetron for generating high frequency energy, a fan motor for cooling said magnetron, and an energization circuit for said magnetron and motor, said circuit including start switch means for providing starting current in the energization circuit for effecting energization of said magnetron, said start switch means comprising a first switch and a protective resistor coupled in series circuit relation, a second switch connected in parallel with such series circuit, actuator means movable by the magnetic field induced in said motor upon energization for operating said second switch, and circuit means connecting said motor to said first and second switches for energization of said motor through either one of said first and second switches.

2. The microwave oven of claim 1 wherein said motor includes a stator and rotor mounted for limited relative axial movement upon energization of said motor, and said second switch is operated in response to such relative axial movement.

3. The microwave oven of claim 2 further comprising means mounting said rotor for rotation and axial movement with respect to said stator and biasing means normally urging said rotor to a position with its magnetic center axially offset from that of said stator when said motor is deenergized, but upon energization of said motor, permitting said rotor to move axially as a result of the magnetic forces induced in said rotor and stator, said second switch being operated in response to such axial movement of said rotor.

4. The microwave oven of claim 3 wherein said rotor is mounted on an axially movable rotor shaft, and a fan blade is also mounted on said rotor shaft, said fan blade during rotation thereof creating an axial force assisting in such axial movement of said rotor upon energization of said motor.

5. The microwave oven of claim 1 wherein said motor comprises a stator and rotor, and said actuator means includes means mounted for movement toward and away from said stator upon energization and deenergization of said motor, said second switch being operated in response to such movement of said actuator means.

6. The microwave oven of claim 5 wherein said means mounted for movement comprises a pole piece.

* * * * *